(12) United States Patent
Michael et al.

(10) Patent No.: US 11,267,975 B2
(45) Date of Patent: Mar. 8, 2022

(54) HYDROPHILIC AQUEOUS DISPERSION CONTAINING SILICON DIOXIDE AND SILANOL, AND PAINT PREPARATION

(71) Applicant: Evonik Operations GmbH, Essen (DE)

(72) Inventors: Günther Michael, Karlstein (DE); Peter Bauermann, Rodgau (DE); Sascha Herrwerth, Freigericht (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/309,514

(22) PCT Filed: Nov. 20, 2019

(86) PCT No.: PCT/EP2019/081871
§ 371 (c)(1),
(2) Date: Jun. 3, 2021

(87) PCT Pub. No.: WO2020/114768
PCT Pub. Date: Jun. 11, 2020

(65) Prior Publication Data
US 2022/0041869 A1   Feb. 10, 2022

(30) Foreign Application Priority Data
Dec. 7, 2018 (EP) .................... 18210927

(51) Int. Cl.
*C09D 7/62* (2018.01)
*C09D 7/65* (2018.01)
*C09D 183/06* (2006.01)
*C09D 175/14* (2006.01)
*C09D 7/40* (2018.01)

(52) U.S. Cl.
CPC ............... *C09D 7/62* (2018.01); *C09D 7/65* (2018.01); *C09D 7/68* (2018.01); *C09D 175/14* (2013.01); *C09D 183/06* (2013.01)

(58) Field of Classification Search
CPC ... C09D 7/62; C09D 7/65; C09D 7/68; C09D 183/06
See application file for complete search history.

(56) References Cited

U.S. PATENT DOCUMENTS

| | | | |
|---|---|---|---|
| 7,470,423 B2 | 12/2008 | Lortz et al. | |
| 8,202,502 B2 | 6/2012 | Floess et al. | |
| 8,333,946 B2 | 12/2012 | Gottschalk-Gaudig et al. | |
| 8,882,901 B2 * | 11/2014 | Michael | C09C 1/3081 106/287.26 |
| 2004/0131527 A1 | 7/2004 | Gottschalk-Gaudig et al. | |
| 2005/0224749 A1 | 10/2005 | Lortz et al. | |
| 2013/0303673 A1 | 11/2013 | Michael et al. | |
| 2019/0127587 A1 | 5/2019 | Lortz et al. | |

FOREIGN PATENT DOCUMENTS

| | | |
|---|---|---|
| CN | 101517012 | 8/2009 |
| DE | 25 24 309 | 12/1976 |
| DE | 102 25 125 | 12/2003 |
| DE | 10 2005 012 409 | 9/2006 |
| EP | 1 433 749 | 6/2004 |
| WO | 2011/076519 | 6/2011 |
| WO | 2012/062559 | 5/2012 |
| WO | 2017/009035 | 1/2017 |

OTHER PUBLICATIONS

European Standard, ÖNORM: "Fillers for coating materials—Requirements and Test methods—Part 19: Precipitated silica;" ISO 3262-19:2000 with English-language machine translation; 29 pages.
International Search Report dated Mar. 16, 2020 in PCT/EP2019/081871 with English translation, 6 pages.
Written Opinion dated Mar. 16, 2020 in PCT/EP2019/081871 with English translation, 9 pages.

* cited by examiner

*Primary Examiner* — Nu A Nguyen
(74) *Attorney, Agent, or Firm* — Grüneberg and Myers PLLC

(57) ABSTRACT

An aqueous dispersion can contain a) 50-80 wt.-% water, b) 10-30 wt.-% hydrophilic silicon dioxide with a methanol wettability of 0 vol.-% methanol in a methanol-water mixture, c) 2-25 wt.-% alcohol alkoxylate, d) 0.1-20 wt.-% silanol, obtained by the hydrolysis of at least one dialkoxysilane, e) 0.5-4 wt.-%, amine or an amine alcohol, f) 0.1-20 wt.-%, copolymer with side chains containing ethers and esters, and g) 0.1-6.0 wt.-% polyethylene glycol or polypropylene glycol.

16 Claims, No Drawings

HYDROPHILIC AQUEOUS DISPERSION CONTAINING SILICON DIOXIDE AND SILANOL, AND PAINT PREPARATION

CROSS REFERENCE TO RELATED APPLICATIONS

This application is the National Stage entry under § 371 of International Application No. PCT/EP2019/081871, filed on Nov. 20, 2019, and which claims the benefit of EP Application No. 18210927.2, filed on Dec. 7, 2018. The contents of each of these applications is incorporated herein by reference in its entirety.

BACKGROUND OF THE INVENTION

Field of the Invention

The present invention relates to basic aqueous dispersions comprising hydrophilic silicon dioxide particles, to a process for the production thereof and to the use thereof in lacquer preparations.

Description of Related Art

Silicon dioxide-containing aqueous dispersions are often used for adjusting the viscosity and other rheological properties of water-based lacquer formulations. Such dispersions consist of a multiplicity of different components and should comprise, inter alia, finely and as homogeneously as possible distributed silicon dioxide particles, be easy to produce, storage-stable and be compatible with diverse components of the water-based lacquer formulations. It is also advantageous if the dispersions have a high silicon dioxide content since transport costs can be reduced as a result and when incorporated into lacquer dispersions, the latter are not diluted with too much water.

WO 2012/062559 A1 describes aqueous dispersions comprising hydrophobized silicon dioxide particles comprising 5-15% by weight alcohol alkoxylate, 0.5-5% by weight of at least one amine or amino alcohol and up to 1% by weight N-methylpyrrolidone. Such dispersions are produced by adding hydrophobized silicas, such as AEROSIL® R 972, to liquid components of the dispersion under intensive mixing. The degree of hydrophobicity of the hydrophobized silicas used can be determined in this case by the methanol wettability, which in this case is preferably from 20 to 80% by volume methanol in methanol-water mixture. Such dispersions have a low viscosity at high solids loading and good storage stability. The production of such aqueous dispersions comprising hydrophobized silicas and incorporation thereof in water-based lacquer formulations can however by very demanding. The hydrophobized silicas can be wetted naturally by water only with the aid of appropriate auxiliaries, wherein a very intensive and relatively long mixing is required and is aggravated by high foam formation.

As is generally known, hydrophilic silicas can be wetted perfectly with water and can therefore be very readily incorporated into an aqueous dispersion. However, hydrophobic silicas often exhibit better rheological properties in water-based lacquer systems compared to hydrophilic silicas. In addition, the known hydrophilic silica-containing aqueous dispersions are incompatible with many lacquer systems and thus the lacquer films have poor optical properties.

WO 2017/009035 A1 describes a process for producing an aqueous silicon dioxide-containing dispersion at a pH of more than 11, in which the dispersion is treated thermally at a temperature of 50 to 95° C.

DE 10 2005 012409 A1 claims an aqueous dispersion comprising a partially hydrophobic silicon dioxide having a methanol wettability of less than 20% by volume methanol in a methanol-water mixture, wherein the dispersion comprises no amines.

SUMMARY OF THE INVENTION

The technical object of the invention is to provide a storage-stable highly-filled silicon dioxide-containing dispersion which can be easily produced and is highly compatible with water-based lacquer formulations, wherein the resulting water-based lacquer systems have good optical and rheological properties.

It is also desirable to provide a storage-stable highly-filled silicon dioxide-containing dispersion having reduced or no amounts of cyclooctamethyltetrasiloxane ($D_4$).

The invention relates to an aqueous dispersion comprising:
a. 50-80% by weight, preferably 55-75% by weight water,
b. 10-30% by weight, preferably 15-25% by weight hydrophilic silicon dioxide,
c. 2-25% by weight of at least one alcohol alkoxylate of the general formula $R^1O((CH_2)_mO)_nH$, wherein
   $R^1$ is a branched or unbranched alkyl or alkenyl radical having 10-25 carbon atoms, m=2 or 3 and n=10-50,
d. 0.1-20% by weight, preferably 0.5-5% by weight of a silanol obtained by hydrolysis of at least one dialkoxysilane of the general formula $R^2R^3Si(OR^4)_2$, wherein $R^2$, $R^3$ and $R^4$ are in each case a branched or unbranched alkyl or alkenyl radical having 1-25 carbon atoms,
e. 0.5-4% by weight, preferably 1.5-4.0% by weight and particularly preferably 2-3% by weight of at least one amine and/or an amino alcohol having a molecular weight of less than 500 g/mol,
f. 0.1-20% by weight of at least one copolymer of the general formula (I)

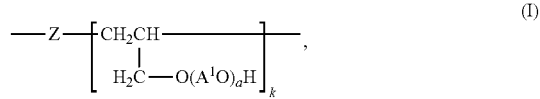

where Z =

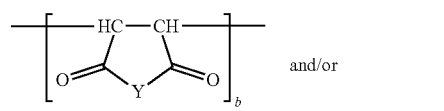

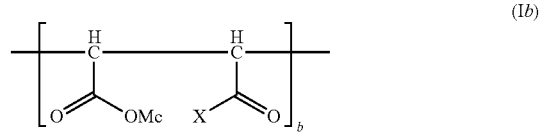

where
M=hydrogen, monovalent or divalent metal cation, ammonium ion, organic amine radical,
c=1, or in the case where M is a divalent metal cation, c=0.5
X=—$OM_c$ or —O—$(C_pH_{2p}O)_q$—$R^5$ where
$R^5$=H, aliphatic hydrocarbon radical having 1 to 20 carbon atoms, cycloaliphatic hydrocarbon radical having 5 to 8 carbon atoms, optionally substituted alkyl radical having 6 to 14 carbon atoms.

p=2-4, q=0-100, —NHR$^6$ and/or —NR$^6_2$ where R$^6$=R$^5$ or
—CO—NH$_2$
Y=O, NR$^6$
A$^1$=ethylene radical, propylene radical, isopropylene radical, butylene radical,
b=10-30, a=0-50, k=10-30, wherein the sum b+k is in the range of 20-60, g. 0.1-6.0% by weight of at least one polyethylene glycol and/or polypropylene glycol, wherein all figures refer to percentages by weight of the entire dispersion composition.

Advantageously, the aqueous dispersion according to the invention has reduced amounts of cyclooctamethyltetrasiloxane (D$_4$) or no cyclooctamethyltetrasiloxane (D$_4$). Cyclooctamethyltetrasiloxane (D$_4$) is a danger to the environment due to its hazardous properties as a persistent, bioaccumulative and toxic substance.

DETAILED DESCRIPTION OF THE INVENTION

US 2008/0069753 A1 describes the production of hydrophobic silicon dioxide particles comprising the addition of an alkoxysilane to an acidic aqueous dispersion of a hydrophilic silica and subsequent drying of the resulting reaction mixture. It is further shown in the comparative examples that the addition of an alkoxysilane (octyltriethoxysilane) to an aqueous dispersion comprising colloidal silicon dioxide at 70° C. in a basic medium (pH=9.5) and subsequent drying of the resulting dispersion also results in the production of hydrophobic silicon dioxide. The carbon content of the two silicas produced either in an acidic or in a basic medium is hardly distinguishable, which indicates that similar degrees of hydrophobization are achieved in both cases.

Completely surprisingly and unexpectedly in the light of the disclosure of US 2008/0069753 A1 it has been found that, inter alia, maintaining a relatively low reaction temperature of <40° C. and adjusting to a pH of <11 during the addition of alkoxysilane to the aqueous dispersion comprising a hydrophilic silica, results in a specific mixture comprising a still hydrophilic silica and hydrolysis products of alkoxysilane being formed which has unique properties.

The invention accordingly further relates to a process for producing an aqueous silicon dioxide-containing dispersion comprising addition of at least one dialkoxysilane of the general formula R$^2$R$^3$Si(OR$^4$)$_2$, wherein R$^2$, R$^3$ and R$^4$ are in each case a branched or unbranched alkyl or alkenyl radical having 1-25 carbon atoms, to a mixture comprising 50-80% by weight water and 10-30% by weight hydrophilic silicon dioxide at a pH of the dispersion of <11, wherein the temperature of the resulting dispersion during and after the addition of the dialkoxysilane does not exceed 40° C. (so-called silanization temperature).

The silanization temperature is preferably <40° C., particularly preferably <30° C., especially preferably <25° C.

Surprisingly, it has been established that the silanization temperature has a major influence on the formation of toxic cyclooctamethyttetrasiloxane (D$_4$).

Therefore, at the silanization temperature selected in accordance with the invention, a free-flowing dispersion can be produced and in addition cyclooctamethyltetrasiloxane (D$_4$) can be reduced or even prevented. The reduction and prevention of toxic D$_4$ is therefore a further advantage of the process.

The dispersion according to the invention comprises hydrophilic silicon dioxide, preferably in amorphous form. This silicon dioxide may include one or more commonly known types of silicas, such as the so-called aerogels, xerogels, perlites, precipitated silicas or fumed silicas. It is preferable when the dispersion according to the invention comprises silicon dioxide from the group consisting of pyrogenic silicon dioxide, precipitated silicon dioxide, silicon dioxide produced by a sol-gel process and mixtures thereof.

The silicon dioxide prepared by precipitation (precipitated silica) is formed for example in the reaction of water glass solutions (water-soluble sodium silicates) with mineral acids. It is also possible here to generate in the solution of sodium silicate a colloidal silicon dioxide (silica sol) which provides dispersions having very small particle sizes and very good dispersion stability. A disadvantage, particularly in the polishing of semiconductor substrates, is the proportion of impurities introduced via the sodium silicate starting material.

Pyrogenic silicon dioxide, also known as fumed silica, is produced by means of flame hydrolysis or flame oxidation. This involves oxidizing or hydrolyzing hydrolyzable or oxidizable starting materials, generally in a hydrogen/oxygen flame. Starting materials that may be used for pyrogenic methods include organic and inorganic substances. Particularly suitable therefor is silicon tetrachloride. The hydrophilic silica thus obtained is amorphous. Fumed silicas are generally in aggregated form. "Aggregated" shall be understood to mean that so-called primary particles initially formed during genesis form strong bonds with one another in the further course of the reaction to form a three-dimensional network. The primary particles are very substantially free of pores and have free hydroxyl groups on their surface. Pyrogenic silicon dioxide exhibits a very high purity and a primary particle size comparable to colloidal silicon dioxide. However, these primary particles undergo aggregation and agglomeration to form relatively hard particles. Dispersion of the aggregates and agglomerates has proven difficult; the dispersions are less stable and have a propensity for sedimentation or else gelation.

A further silicon dioxide source suitable for producing the dispersions according to the invention is a silicon dioxide produced by a sol-gel process, for example an aerogel, a xerogel or similar materials. Starting materials for an SiO$_2$ sol synthesis are often silicon alkoxides. The hydrolysis of such precursors and the condensation between the thus formed reactive species are the essential fundamental reactions in the sol-gel process. Suitable silicon sources include in particular the tetraalkyl orthosilicates, for example tetramethyl orthosilicate or tetraethyl orthosilicate. Removal of the alcohol formed in the hydrolysis of tetraalkyl orthosilicates is carried out under supercritical conditions (for methanol, temperature >239.4° C.; pressure >80.9 bar) and results in the formation of highly porous SiO$_2$ aerogels.

Compared to the typical precipitated silicas, a fumed silica is more efficient in increasing viscosity, provides a better suspension stability in low-viscosity resins and results in better clarity. The advantages of precipitated silica compared to fumed silica include faster and shear-independent dispersion, lower costs, better profile of the coating or of the glaze, lower porosity in gelcoats. Consequently, a mixture of fumed silica and precipitated silica is used in numerous cases to obtain the advantages of both silica types.

However, it is very particularly preferable when one or more fumed silicas are used in the dispersion according to the invention.

The dispersion according to the present invention comprises from 10 to 30% by weight, preferably from 15 to 25% by weight, hydrophilic silicon dioxide.

The term "hydrophilic" in the context of the present invention refers to particles which can be fully wetted with pure water. Hydrophobic particles cannot be wetted by pure water; they have hydrophobicity. Such hydrophobicity may typically be achieved by application of appropriate nonpolar groups to the silica surface. The extent of the hydrophobicity of a silica may be determined via parameters including its methanol wettability, as more particularly described in WO2011/076518 A1, pages 5-6, for example. In pure water, a hydrophobic silica separates completely from the water and floats on the surface thereof without being wetted with the solvent. In pure methanol, by contrast, a hydrophobic silica is distributed throughout the solvent volume; complete wetting takes place. Measurement of methanol wettability determines a maximum content of methanol in a methanol-water test mixture at which wetting of the silica still does not take place, i.e. after contact with the test mixture 100% of the employed silica remains unwetted and separates from the test mixture. This methanol content in the methanol-water mixture in % by volume is called methanol wettability. The higher such a methanol wettability, the more hydrophobic the silica. The lower the methanol wettability, the lower the hydrophobicity of the material.

The hydrophilic silicon dioxide present in the dispersion according to the invention has a methanol wettability of 0% by volume methanol in a methanol-water mixture. The silica is therefore completely wetted by pure water.

Silica and silicon dioxide can be used as synonyms.

To isolate the hydrophilic silica from the dispersion according to the invention and to determine the methanol wettability thereof, the dispersion can be dried, wherein all volatile components of the dispersion are removed. The resulting residue can then be washed repeatedly, at least three times, with water, removed each time from the filtrate by centrifugation and be analysed for the methanol wettability thereof.

The dispersion of the present invention is preferably basic and has a pH of <11, preferably of 9 to <11, particularly preferably of 10 to <11.

With respect to the hazard classifications "corrosivity/irritating to the skin" and "severe eye damage/eye irritant" according to UN-GHS (Global Harmonized System of Classification and Labelling of Chemicals) and in accordance with Regulation (EC) No. 1272/2008 (CLP regulation), this applies to a mixture as irritating to the skin (category 1) or as causing severe damage to the eyes (category 1) if it has an extreme pH of ≤2 or ≥11.5.

A high level of protection to human health and the environment can therefore be granted to the dispersion according to the invention and the production thereof.

It has further proven advantageous when silicon dioxide particles in the dispersion according to the invention have a numerical mean particle size $d_{50}$ of not more than 300 nm. A range of 100 to 250 nm is particularly preferred. A numerical mean particle size may be determined according to ISO13320:2009 by laser diffraction particle size analysis.

Employable hydrophilic pyrogenic silicon dioxides are hydrophilic pyrogenic silicon dioxides having a BET surface area of 20 to 500 $m^2/g$, preferably of 30 to 410 $m^2/g$. It is particularly preferable to employ hydrophilic pyrogenic silicon dioxides having a BET surface area of 200±25, 300±30 or 380±30 $m^2/g$. The specific surface area, also referred to simply as BET surface area, is determined according to DIN 9277:2014 by nitrogen adsorption in accordance with the Brunauer-Emmett-Teller method.

The silicon dioxide employed in the dispersion according to the invention may have a tamped density of up to 400 g/L, preferably of 20 to 300 g/L, particularly preferably of 30 to 200 g/L, very particularly preferably of 40 to 100 g/L. Tamped densities of various pulverulent or coarse-grain granular materials may be determined according to DIN ISO 787-11:1995 "General methods of testing pigments and extenders—Part 11: Determination of tamped volume and apparent density after tamping". This involves measuring the bulk density of a bulk material after agitation and tamping.

The hydrophilic silicon dioxide used in the dispersion according to the invention preferably has a carbon content of <0.1%, measured with a carbon analyser: LECO CS 244 (LECO Corporation, St. Joseph, Mich., 49085-2396, USA) according to OENORM G 1072.

The hydrophilic silicon dioxide used in the dispersion according to the invention preferably has a silanol group density of 1.5-2.7 silanol groups/$nm^2$, measured by the lithium alanate method, described in the Journal of Colloid and Interface Science, Vol. 125, No. 1, September 1988, pp. 62-63.

The proportion of water in the aqueous dispersion according to the invention is from 50 to 80%, particularly preferably from 55 to 75% by weight.

The dispersion according to the invention may further comprise up to 10% by weight of at least one organic solvent, with the exception of N-methylpyrrolidone. The solvent is preferably selected from the group consisting of aliphatic, cycloaliphatic and aromatic hydrocarbons, alcohols, glycols, glycol ethers, ketones, esters and ethers. Explicit mention may be made of n-hexane, n-heptane, cyclohexane, toluene, xylene, ethylbenzene, cumene, styrene, dichloromethane, 1,2-dichlorethane, methanol, ethanol, 1-propanol, 2-propanol, 1-butanol, isobutanol, 2-ethylhexanol, cyclohexanol, diacetone alcohol, acetone, methyl ethyl ketone, methyl isobutyl ketone, diisobutyl ketone, cyclohexanone, mesityl oxide, isophorone, methyl acetate, methyl acetate, ethyl acetate, butyl acetate, butyl ether, ethyl acetate, butyl acetate, isobutyl acetate, methyl glycol acetate, butyl glycol acetate, ethyl diglycol acetate, butyl diglycol acetate, methoxypropyl acetate, ethoxypropyl acetate, ethylene carbonate, propylene carbonate, diethyl ether, methyl tert-butyl ether, tetrahydrofuran, dioxane, 1-methoxy-2-propanol, 1-ethoxy-2-propanol, 1-isopropoxy-2-propanol, 1-isobutoxy-2-propanol, ethyl glycol, propyl glycol, butyl glycol, ethyl diglycol, butyl diglycol, methyl dipropylene glycol, ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, tripropylene glycol, hexanediol, octanediol and triethylene glycol. Employable with particular preference are diethylene glycol, dipropylene glycol and tripropylene glycol.

The dispersion according to the invention is preferably very largely free from colour pigments and binders employed in the lacquer industry. In a preferred embodiment of the invention, the proportion of silicon dioxide is at least 90% by weight, particularly preferably at least 98% by weight, of the solids content of the dispersion. Very particular preference is given to an embodiment in which the solid phase of the dispersion consists entirely of silicon dioxide.

The dispersion according to the invention may comprise up to 1% by weight, preferably 0 to 0.5% by weight N-methylpyrrolidone. In a particularly preferred embodiment of the invention however, the dispersion does not comprise any N-methylpyrrolidone.

Used in the dispersion according to the invention is from 2 to 25% by weight, preferably from 5 to 15% by weight, of an alcohol alkoxylate of the general formula $R^1O((CH_2)_mO)_nH$, wherein $R^1$ is a branched or unbranched alkyl or alkenyl radical having 10-25 carbon atoms, m=2 or 3 and n=10-50.

Explicitly mentioned are $CH_3(CH_2)_{10}CH_2O[(CH_2)_2O]_{18}H$, $CH_3(CH_2)_{12}CH_2O[(CH_2)_2O]_{18}H$, $CH_3(CH_2)_{14}CH_2O[(CH_2)_2O]_{18}H$, $CH_3(CH_2)_{16}CH_2O[(CH_2)_2O]_{18}H$, $CH_3(CH_2)_{10}CH_2O[(CH_2)_2O]_{20}H$; $CH_3(CH_2)_{12}CH_2O[(CH_2)_2O]_{20}H$, $CH_3(CH_2)_{14}CH_2O[(CH_2)_2O]_{20}H$, $CH_3(CH_2)_{14}CH_2O[(CH_2)_2O]_{20}H$, $CH_3(CH_2)_{10}CH_2O[(CH_2)_2O]_{23}H$, $CH_3(CH_2)_{12}CH_2O[(CH_2)_2O]_{23}H$, $CH_3(CH_2)_{14}CH_2O[(CH_2)_2O]_{23}H$ and $CH_3(CH_2)_{16}CH_2O[(CH_2)_2O]_{23}H$.

The dispersion according to the invention comprises 0.1-20% by weight of a silanol obtained by hydrolysis of at least one dialkoxysilane of the general formula $R^2R^3Si(OR^4)_2$, wherein $R^2$, $R^3$ and $R^4$ are in each case a branched or unbranched alkyl or alkenyl radical having 1-25 carbon atoms.

Particular preference may be given to using dimethyldiethoxysilane, dimethyldimethoxysilane, dimethyldipropoxysilane, dimethyldibutoxysilane, diethyldiethoxysilane, diethyldimethoxysilane, dimethyldipropoxysilane, diethyldibutoxysilane or mixtures thereof.

A silanol present in the dispersion according to the invention is preferably a dialkyldisilanol of the general formula

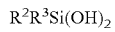

and/or an α,ω-dihydroxydialkylsiloxane of the general formula

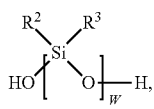

wherein $R^2$ and $R^3$ are in each case a branched or unbranched alkyl radical having 1-25 carbon atoms and w is an integer greater than 1.

The molar ratio of silanol to silicon dioxide in the dispersion according to the invention is preferably from 0.01 to 0.5, particularly preferably from 0.02 to 0.2 and very particularly preferably 0.03 to 0.1.

The silanol in the dispersion according to the invention can be absorbed both in free form and can be physically bound to the silicon dioxide surface. This latter type of bonding is to be distinguished from chemical bonding such as in the case of hydrophobizing silica with silanes. The relatively weakly physically bonded silanol can be simply removed from the surface by washing the residue repeatedly with water after drying the dispersion according to the invention. In contrast, the silyl groups chemically bonded to the $SiO_2$ surface of a hydrophobized silica cannot be removed by washing with water.

The dispersion according to the invention comprises 0.5-4% by weight, preferably 1.5-4.0% by weight and particularly preferably 2-3% by weight of at least one amine and/or an amino alcohol having a molecular weight of less than 500 g/mol.

It is possible to use as amine, for example, ammonia, primary amines of the general formula $R^7NH_2$, secondary amines of the general formula $R^7R^8NH$ and/or tertiary amines of the general formula $R^7R^8R^9N$, wherein $R^7$, $R^8$, $R^9$ are each independently branched or unbranched alkyl radicals having 1-25 carbon atoms.

The term amino alcohol is to be understood as meaning a compound containing at least one amino group and at least one hydroxyl group. The molecular weight of the amino alcohol for use in the present invention is preferably from 50 to 500 g/mol, particularly preferably from 100 to 250 g/mol. Suitable amino alcohols are 2-aminoethanol, 1-aminoethanol, 3-amino-1-propanol, 2-amino-1-propanol, 1-amino-2-propanol, 2-amino-2-methyl-1-propanol, 2-amino-2-methyl-1,3-propanediol, 2-amino-2-hydroxymethyl-1,3-propanediol, 2-(2-aminoethoxy)ethanol, 2-amino-1-butanol, 4-amino-1-butanol, 1-amino-2-butanol, 1-amino-3-butanol, 3-amino-1-butanol, 2-amino-1-cyclohexanol, 3-amino-1-cyclohexanol, 4-amino-1-cyclohexanol, 2-amino-1-(hydroxymethyl)cyclopentane, 2-amino-1-hexanol, 6-amino-1-hexanol, 2-amino-3-methyl-1-butanol, 1-(aminomethyl)cyclohexanol, 6-amino-2-methyl-2-heptanol, 2-amino-3-methyl-1-pentanol, 2-amino-4-methyl-1-pentanol, 2-amino-1-pentanol, 5-amino-1-pentanol, 1-amino-2,3-propanediol, 2-amino-1,3-propanediol, 2-amino-1,3-propanediol, 2-((3-aminopropyl)methylamino)ethanol, 1-(2-dimethylaminoethoxy)-2-propanol, 1-(1-dimethylamino-2-propoxy)-2-propanol, 2-(1-dimethylamino-2-propoxy)ethanol, 2-(2-dimethylaminoethoxy)ethanol and 2-[2-(2-dimethylaminoethoxy)ethoxy]ethanol or mixtures thereof. N,N-dialkylalkanolamines such as N,N-dimethylethanolamine and N,N-dimethylisopropanolamine are particularly preferred.

The dispersion according to the invention further comprises from 0.1% to 6.0% by weight of at least one polyethylene glycol and/or polypropylene glycol. Preference is given to polypropylene glycols having an average molecular weight (mass-average) of 100 g/mol or more, particularly preferably of 150 to 6000 g/mol.

The dispersion according to the invention comprises 0.1-20% by weight of at least one copolymer of the general formula (I)

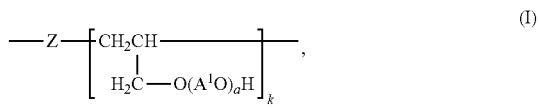

where Z =

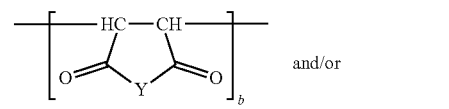

and/or

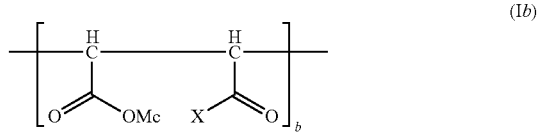

where

M=hydrogen, monovalent or divalent metal cation, ammonium ion, organic amine radical, c=1, or in the case where M is a divalent metal cation, c=0.5

$X = —OM_c$ or $—O—(C_pH_{2p}O)_q—R^5$ where $R^5$=H, aliphatic hydrocarbon radical having 1 to 20 carbon atoms, cycloaliphatic hydrocarbon radical having 5 to 8 carbon atoms, optionally substituted alkyl radical having 6 to 14 carbon atoms, p=2-4, q=0-100, —NHR$^6$ and/or —NR$^6_2$ where R$^6$=R$^5$ or —CO—NH$_2$

Y=O, NR$^6$

A$^1$=ethylene radical, propylene radical, isopropylene radical, butylene radical, b=10-30, a=0-50, k=10-30, wherein the sum b+k is in the range of 20-60.

-(A$^1$O)$_a$— may be either a homopolymer of one of the specified alkylene oxides or a block copolymer or copolymer having a random distribution of two or more of the monomers in the polymer molecule. The units [ ]$_b$ and [ ]$_k$ may likewise be in the form of block copolymers or copolymers having a random distribution of two or more of the monomers in the polymer molecule.

Preferably used as monovalent or divalent metal cation M are sodium, potassium, calcium and magnesium ions. Preferably employed as organic amine radicals are substituted ammonium groups derived from primary, secondary or tertiary C$_1$- to C$_{20}$-alkylamines, C$_1$- to C$_{20}$-alkanolamines, C$_5$- to C$_8$-cycloalkylamines and C$_6$- to C$_{14}$-arylamines. Examples of corresponding amines are methylamine, dimethylamine, trimethylamine, ethanolamine, diethanolamine, triethanolamine, cyclohexylamine, dicyclohexylamine, phenylamine, diphenylamine in the protonated (ammonium) form.

In a preferred embodiment, p=2 or 3, and the groups X are derived from polyethylene oxide or polypropylene oxide.

Employable with preference is a copolymer of the general formula Ia or Ib, wherein A$^1$ is an ethylene radical, a=5 to 20, and the sum b+k is in the range from 20 to 40.

Furthermore, defoaming agents and preservatives can be added to the dispersion according to the invention. The proportion thereof in the dispersion is generally below 1% by weight.

The invention further provides a lacquer preparation containing the dispersion according to the invention.

Suitable binders here may be the resins customary in lacquer and coating technology, such as are described for example in "Lackharze, Chemie, Eigenschaften und Anwendungen, Editors D. Stoye, W. Freitag, Hanser Verlag, Munich, Vienna 1996".

Examples include inter alia polymers and copolymers of (meth)acrylic acid and their esters, optionally bearing further functional groups, with further unsaturated compounds, such as for example styrene, polyether polyols, polyester polyols, polycarbonate polyols, polyurethane polyols and epoxy resins and also any desired mixtures of these polymers, and also fatty-acid-modified alkyd resins produced by polycondensation.

Also employable as polymer components are organic hydroxyl-bearing compounds, for example polyacrylate, polyester, polycaprolactone, polyether, polycarbonate and polyurethane polyols and hydroxy-functional epoxy resins and also any desired mixtures of these polymers. Employed in particular are aqueous or solvent-containing or solvent-free polyacrylate and polyester polyols and any desired mixtures thereof.

Polyacrylate polyols are copolymers of hydroxyl-containing monomers with other olefinically unsaturated monomers, for example esters of (meth)acrylic acid, styrene, alpha-methylstyrene, vinyltoluene, vinylesters, maleic and fumaric monoalkyl and dialkyl esters, alpha-olefins and other unsaturated oligomers and polymers.

The lacquer preparation according to the invention may further contain colour pigments and/or inactive fillers.

The colour pigments may be organic or inorganic in nature. Examples include lead oxides, lead silicates, iron oxides, phthalocyanine complexes, titanium dioxides, zinc oxides, zinc sulfide, bismuth vanadate, spinel mixed oxides, for example titanium-chromium, titanium-nickel or tin-zinc spinel mixed oxides, platelet-shaped metallic or interference pigments and carbon blacks.

The lacquer preparation according to the invention may further contain inactive fillers. "Inactive fillers" shall be understood to mean fillers known to those skilled in the art which have only an insignificant effect, if any, on the rheological properties of the preparation. Examples include calcium carbonate, diatomaceous earth, mica, kaolin, chalk, quartz and talc.

Colour pigments and/or inactive fillers are typically present in proportions which sum to 10% to 70% by weight, preferably from 30% to 50% by weight, based on the total solids content of the preparation.

The total solids content of the lacquer preparation which is composed of silicon dioxide particles, binders and optionally colour pigments and inactive fillers is preferably from 10 to 80% by weight, particularly preferably from 20 to 70% by weight, very particularly preferably from 30 to 60% by weight, based on the total mass of the lacquer preparation.

The invention further relates to the use of the dispersion according to the invention as an additive to hydrofillers in the automotive industry, as an additive in water-based UV-curable formulations, in aqueous clearcoats and in pigmented coating systems.

The invention further relates to a process for producing an aqueous silicon dioxide-containing dispersion comprising addition of at least one dialkoxysilane of the general formula R$^2$R$^3$Si(OR$^4$)$_2$, wherein R$^2$, R$^3$ and R$^4$ are in each case a branched or unbranched alkyl or alkenyl radical having 1-25 carbon atoms, to a mixture comprising 50-80% by weight water and 10-30% by weight hydrophilic silicon dioxide at a pH of the dispersion of <11, wherein the temperature of the resulting dispersion during and after the addition of the dialkoxysilane does not exceed 40° C.

The dispersion preferably has a pH of <11, preferably of 9 to <11, particularly preferably of 10 to <11.

The silanization temperature is preferably <40° C., particularly preferably <30° C., especially preferably <25° C.

The hydrophilic silicon dioxide used in the process according to the invention is preferably a fumed silica having a BET surface area of 30 to 410 m$^2$/g.

The hydrophilic silicon dioxide used in the process according to the invention is preferably in the form of a powder.

The molar ratio of dialkoxysilane used in the process according to the invention to silicon dioxide used is preferably from 0.02 to 0.2, especially preferably from 0.03 to 0.1.

The dispersion according to the invention described above can be produced, for example, by the process according to the invention.

The process according to the invention is preferably carried out such that the dialkoxysilane is added to a finely dispersed aqueous mixture of hydrophilic silicon dioxide. The silicon dioxide particles in this aqueous mixture preferably have a numerical mean particle size d$_{50}$ of at most 300 nm, particularly preferably of 100 to 250 nm. A numerical mean particle size may be determined according to ISO13320:2009 by laser diffraction particle size analysis. The aqueous mixture comprising silicon dioxide used in the process of the invention is preferably produced by adding the hydrophilic silicon dioxide to an aqueous mixture at a rotational speed of at least 2000 rpm (disc diameter 40 mm), particularly preferably of at least 4000 rpm (disc diameter 40 mm). This will ensure that the silanol formed by hydrolysis of the dialkoxysilane used is optimally attached and/or physically bound to the surface of the finely distributed silicon dioxide.

It has further proven advantageous if the reaction mixture is stirred during addition of the silanol to the aqueous mixture of the hydrophilic silicon dioxide.

When carrying out the process according to the invention, the aqueous dispersion is stirred at a rotational speed of at least 100 rpm and at most 500 rpm (disc diameter 40 mm in each case) during and after the addition of dialkoxysilane.

The process according to the invention, particularly addition of silicon dioxide and of dialkoxysilane can be conducted, for example, in a dispersing apparatus. Apparatuses suitable as such a dispersing apparatus include all apparatuses capable of bringing about intensive wetting of the pulverulent or granular silicon dioxide with the aqueous phase. The lacquer industry typically uses so-called dissolvers for this purpose, the relatively simple construction of which allows for a low-maintenance and easy-clean mode of production. However, depending on the required viscosity or else fill level of the aqueous dispersion to be generated, intensive dispersing or post-milling is still necessary. Post-milling may be carried out in an agitator bead mill for example. However, intensive shearing using rotor/stator machines is often sufficient. An expedient combination of wetting and dispersing facility is provided by the rotor/stator machines from Ystral which allow the powder to be aspirated and, after closing the powder aspiration opening, dispersed by intensive shearing.

Especially when using rotor/stator machines where aspiration of air and thus foam formation can occur, it has proven advantageous to initially charge only a portion of the required water and the additives and to incorporate a portion of the silicon dioxide. Above a particular amount of silicon dioxide of about 25-30% by weight, based on the entirety of the silicon dioxide to be incorporated, the defoaming effect thereof is apparent. Only after addition of the entire amount of powder are the remaining proportions of water subsequently added. This reserves a sufficient volume in the make-up vessel for the initial foam formation at commencement of the powder addition.

In order to ensure the homogeneity of the dispersions according to the invention, a stepwise mixing of the components can advantageously be carried out, especially in the case of storage-stable highly filled silicon dioxide-containing dispersions.

In a particularly preferred embodiment of the invention, the aqueous dispersion after addition of dialkoxysilane is matured at a temperature of 0 to 40° C. for at least 24 hours, particularly preferably at least 36 hours, especially preferably at least 48 hours. After such a maturing period, for example, optimal rheological results are achieved when using the dispersions produced in lacquers.

The examples which follow are provided merely to elucidate this invention to those skilled in the art and do not constitute any limitation of the claimed dispersion or of the claimed process whatsoever.

EXAMPLES

1. Production of the Dispersions

Comparative Examples 1-4, Inventive Examples 3-5

The dispersions were produced by firstly mixing all liquid components of the dispersion according to Table 1 except dialkoxysilane by means of a dissolver (Dispermill Vango 100, manufacturer: ATP Engineering B.V.) with a disc diameter of 40 mm at 2500-5000 rpm and at room temperature over 30 minutes. The silicon dioxide powder was then added with stirring, initially pre-dispersed by means of the dissolver at 2500-5000 rpm without cooling within 15-65 minutes, and then dispersed by means of a rotor-stator Ultra-Turrax (Polytron 6000, disc diameter 35 mm) at 7000-10 000 rpm over 30 minutes with water cooling at 20° C. Subsequently, the dialkoxysilane is added at 20° C. with stirring by means of a dissolver at 100-500 rpm with further cooling to 20° C. and the mixture is further stirred for 15 minutes under constant conditions.

The composition of the dispersions and their physico-chemical properties are summarized in Table 1. Examples 1 and 2 are premixes for the dispersions according to the invention (Examples 3-5).

Determination of Methanol Wettability

To determine the hydrophobicity of the silica present in the respective dispersion, 25 g of a particular dispersion were dried at 40° C. in a drying cabinet over 72 hours, 5 grams of the residue were taken up in 30 mL of water in a centrifuge tube and homogenized by shaking, then centrifuged for two hours at 20 000 revolutions per minute in a centrifuge (Sorvall RC-28S). The centrifugate is then washed ten times in this manner as described above and then dried at 40° C. in the drying cabinet over a period of 72 hours.

The residue was tested for possible hydrophobic constituents using the method of methanol wettability.

In the determination of the methanol wettability, 0.2 g of solid in each case were weighed into transparent centrifuge tubes, 8.0 ml of a methanol/water mixture using respectively 10, 20, 30, 40, 50, 60, 70 and 80% by volume of methanol were added to each weighed quantity. The sealed tubes were shaken for 30 seconds and then centrifuged for 5 minutes at 2500 $min^{-1}$. The sediment volumes were read off, converted to percentages, and plotted on a graph against methanol content (% by volume). The inflection point of the curve corresponds to the methanol wettability.

The dispersions according to the invention P5-1 to P5-3 have a low viscosity 24 hours after their production despite the high solids content of ca. 17%.

The viscosities at 0.5 $sec^1$ (measured using Rheometer Physica MCR 300, manufacturer: Anton Paar GmbH, sample tubes composed of aluminium or stainless steel, rotary bodies CC27) do not increase significantly upon storage over 4 weeks, see Table 1a. The dispersions according to the invention are thus easy to handle, for example, remaining pumpable through pipelines. The dispersions also exhibit no sediment.

TABLE 1a

| Viscosity change after 4 weeks' storage | | | |
|---|---|---|---|
| Viscosity at 0.5 $sec^{-1}$ mPa s | P5-1 | P5-2 | P54 |
| After production | 53 | 109 | 514 |
| After 4 weeks' storage | 56 | 238 | 1602 |

The hydrophobic silicon dioxide particles can no longer be adequately dispersed in dispersions P2 and especially P3. The particle size $d_{95}$ is, for example in P3, over 10 000 nm, therefore such dispersions are no longer usable for high-quality lacquers. The dispersions P5-1 to P5-3 according to the invention in contrast, are easy to produce and have no coarse particles and are therefore well-suited for producing high-quality lacquers.

Prior to the measurement, it is ensured that the surface of the test panel with the applied lacquer to be tested is clean.

TABLE 1

Production of aqueous SiO$_2$-containing dispersions

| Examples | Comp. ex. 1 | Comp. ex. 2 | Comp. ex. 3 | Comp. ex. 4 | Example 1 | Example 2 | Example 3 | Example 4 | Example 5 |
|---|---|---|---|---|---|---|---|---|---|
| SiO$_2$ source | none | R 972[a] | R 974[b] | R 976 S[c] | AE 300[d] | AE 300[d] | AE 300[d] | AE 300[d] | AE 300[d] |
| Dispersion No. | P0 | P1 | P2 | P3 | P4 | P5-0 | P5-1 | P5-2 | P5-3 |
| Initial weights, [g] | | | | | | | | | |
| P5-0 | | | | | | | 100 | 100 | 100 |
| Water | 67.5 | 67.5 | 55 | 55 | 76 | | | | |
| P4 | | | | | | 80 | | | |
| Tripropylene glycol (TPG) | 1 | 1 | 2 | 2 | — | 2 | | | |
| Byk 011[e] | 0.3 | 0.3 | 0.6 | 0.6 | — | 0.6 | | | |
| Dimethylaminoethanol (DMEA) | 2 | 2 | 4 | 4 | — | 2 | | | |
| Ammonia (NH$_3$) | — | — | — | — | 2 | | | | |
| TEGO DISPERS ® 760 W[f] | 8.9 | 8.9 | 17.8 | 17.8 | — | 17.8 | | | |
| Surfynol ® 104 E[g] | 0.3 | 0.3 | 0.6 | 0.6 | — | 0.6 | | | |
| SiO$_2$ source | none | 20 | 20 | 20 | 22 | (17.1%[h]) | (16.9%[i]) | (16.7%[i]) | (16.5%[i]) |
| Dimethyldiethoxysilane | none | none | none | none | none | none | 1.15 | 2.3 | 3.8 |
| All initial weights, sum total | 80 | 100 | 100 | 100 | 100 | 103 | 101.15 | 102.3 | 103.8 |
| Dispersion | | | | | | | | | |
| Powder incorporation time, min | none | 40 | 40 | 65 | 15 | 15 | 15 | 15 | 15 |
| Dispersal time UT, min | none | 30 | 30 | 30 | 30 | 30 | 30 | 30 | 30 |
| Dispersion properties | | | | | | | | | |
| pH | 10.90 | 10.44 | 10.75 | 11.17 | 10.30 | 10.64 | 10.60 | 10.59 | 10.58 |
| D(50) in nm | — | 108 | 200 | 171 | 99 | 137 | 104 | 116 | 113 |
| D(95) in nm | — | 245 | 1880 | 10230 | 207 | 223 | 405 | 367 | 360 |
| SiO$_2$ methanol wettability in % by volume | — | 35 | 35 | 30 | 0 | 0 | 0 | 0 | 0 |

[a]R 972 = hydrophobic silica with BET 90-130 m$^2$/g, hydrophobizing agent dimethyldichlorosilane, manufacturer Evonik Resource Efficiency GmbH.
[b]R 974 = hydrophobic silica with BET 150-190 m$^2$/g, hydrophobizing agent dimethyldichlorosilane, manufacturer Evonik Resource Efficiency GmbH.
[c]R 976 S = hydrophobic silica with BET 225-275 m$^2$/g, hydrophobizing agent dimethyldichlorosilane, manufacturer Evonik Resource Efficiency GmbH.
[d]AE 300 = Aerosil ® 300, a hydrophilic silica with BET = 300 m$^2$/g, manufacturer Evonik Resource Efficiency GmbH.
[e]Byk 011 = defoamer, manufacturer BYK Additives & Instruments.
[f]TEGO DISPERS ® 760 W = dispersant, manufacturer Evonik Resource Efficiency GmbH.
[g]Surfynol ® 104 E = non-ionic surfactant, manufacturer Resource Efficiency GmbH.
[h]is added via P4
[i]is added via P5-0

2. Production of the Lacquers with Silicon Dioxide-Containing Dispersions

Comparative Examples 5-8, Examples 6-8

To an aqueous polyurethane-acrylate hybrid dispersion (Ecrothan 2012) stirred at room temperature at 1000 rpm with a propeller stirrer (manufacturer: Heidolph) were added the other lacquer components specified in Table 2 followed by the respective silicon dioxide-containing dispersion. The lacquer dispersion thus obtained was further stirred at 1000 rpm for 10 minutes.

The composition of the water-based lacquer formulations and their physicochemical properties are summarized in Table 2.

Determination of the Transparency (Jetness)

Instrument: Densitometer D19C from Grethag Macbeth.

Using a densitometer, the transparency of a clearcoat can be measured via the black number $M_Y$ of a dried lacquer film. The determination is made on lacquer films which have been applied to glass plates and which were placed on a black-coated panel (Q-Panel DT 36).

Application: 150 μm bar applicator on 2 mm transparent glass sheet.

Drying conditions: Ventilation and drying at room temperature.

The measuring instrument is placed with the measurement opening on the test panel. By pressing the measurement button with the thumb, the measurement is triggered.

For the black number $M_Y$, 5 measurements are carried out per glass plate from which an average value is calculated. The results are shown as densitometer value ($D_B$). The greatest allowable deviation between the lowest and highest value should be at maximum $D_B$=0.05.

The result is stated as black number $M_Y$, which is calculated as follows from the densitometer value: $M_Y=D_B\times 100$ Determination of the Thixotropic Indices The determination of the thixotropic indices is carried out by viscosity measurements not earlier than 24 hours after production (measuring instrument: Rheometer Physica MCR 300, manufacturer: Anton Paar GmbH, sample tubes composed of aluminium or stainless steel, rotary body CC27), wherein the thixotropic index $T_i$=viscosity at 0.5 rpm/viscosity at 500 rpm.

The corresponding viscosity values are taken from the decreasing flow curve. Parameters for creating the flow curve: $\dot{\gamma}$=0.01 s$^{-1}$ increasing to 500 s$^{-1}$ and from 500 s$^{-1}$ dropping back to 0.01 s$^{-1}$ The thixotropic index is a measure of the rheological efficacy of a dispersion in a lacquer. The higher this index, the lower the tendency of the lacquer to run off vertical surfaces.

All lacquers with silicon dioxide-containing dispersions, as expected, show somewhat lower transparency (jetness) values than the pure clearcoat without SiO$_2$ (comparative example 5, Table 2). The pure clearcoat, however, shows substantially lower thixotropic indices than the lacquer modified with SiO$_2$-containing pastes (Table 2). The lacquers with the inventive dispersions P5-1 (Example 6), P5-2 (Example 7) and P5-3 (Example 8) have substantially higher thixotropic indices and higher transparency (jetness) values than the lacquers comprising hydrophilic silica AEROSIL® 300, but without DMEA and/or dialkoxysilane (dispersions P4 and P5-0, comparative examples 7 and 8) or hydrophobized silica AEROSIL® R 972 (dispersion P1, comparative example 6).

All hydrophilic silicas can be very easily and rapidly (15 min) incorporated into the aqueous mixtures, whereas hydrophobic silicas need considerably longer for this (40-65 min, comparative examples 2-4).

TABLE 2

Clearcoat with/without silicon dioxide-containing dispersions

| Example | Comp. ex. 5 | Comp. ex. 6 | Comp. ex. 7 | Comp. ex. 8 | Example 6 | Example 7 | Example 8 |
|---|---|---|---|---|---|---|---|
| Dispersion | P0 | P1 | P4 | P5-0 | P5-1 | P5-2 | P5-3 |
| Lacquer | L-P0 | L-P1 | L-P4 | L-P5-0 | L-P5-1 | L-P5-2 | L-P5-3 |
| Initial weights, g | | | | | | | |
| Ecrothan 2012$^a$ | 80 | 80 | 80 | 80 | 80 | 80 | 80 |
| Dipropylene glycol methyl ether (DPM) | 3 | 3 | 3 | 3 | 3 | 3 | 3 |
| PnB$^b$ | 4.2 | 4.2 | 4.2 | 4.2 | 4.2 | 4.2 | 4.2 |
| DPnB$^c$ | 2.2 | 2.2 | 2.2 | 2.2 | 2.2 | 2.2 | 2.2 |
| Triethylamine (TEA) | 0.2 | 0.2 | 0.2 | 0.2 | 0.2 | 0.2 | 0.2 |
| Water | 3 | 3 | 3 | 3 | 3 | 3 | 3 |
| Tego Foamex ® 805 N$^d$ | 0.2 | 0.2 | 0.2 | 0.2 | 0.2 | 0.2 | 0.2 |
| BYK 346$^e$ | 0.2 | 0.2 | 0.2 | 0.2 | 0.2 | 0.2 | 0.2 |
| Paste | 8 | 10 | 10 | 10 | 10 | 10 | 10 |
| Sum of initial weights, g | 101 | 103 | 103 | 103 | 103 | 103 | 103 |
| Lacquer properties | | | | | | | |
| Ti (Thix index) clearcoat | 1.30 | 1.67 | 1.48 | 1.57 | 1.92 | 3.05 | 3.05 |
| Transparency/Jetness | 274 | 236 | 223 | 228 | 239 | 246 | 242 |

$^a$Ecrothan 2012 = aqueous polyurethane-acrylate hybrid dispersion, manufacturer Michelman INC.
$^b$PnB = Solvenon ® PnB, propylene glycol monobutyl ether 1-butoxy-2-propanol, manufacturer BASF SE.
$^c$DPnB = Solvenon ® DPnB, dipropylene glycol monobutyl ether butoxydipropanol isomeric mixture, manufacturer BASF SE.
$^d$Tego Foamex ® 805 N = defoamer, manufacturer Evonik Resource Efficiency GmbH
$^e$BYK 346 = silicone surfactant, manufacturer BYK Additives & Instruments.

3. Production of the Aqueous SiO$_2$-Containing Dispersions with Various Amine Concentrations Comparative Example 4a, Inventive Examples 4b-4d The dispersions were produced by firstly mixing all liquid components of the dispersion according to Table 3 except dialkoxysilane by means of a dissolver (Dispermill Vango 100, manufacturer: ATP Engineering B.V.) with a disc diameter of 40 mm at 2500-5000 rpm and at room temperature over 30 minutes. The silicon dioxide powder was then added with stirring, initially pre-dispersed by means of the dissolver at 2500-5000 rpm without cooling within 15-60 minutes, and then dispersed by means of a rotor-stator Ultra-Turrax (Polytron 6000, disc diameter 35 mm) at 7000-10 000 rpm over 30 minutes with water cooling at 20° C. Subsequently, the dialkoxysilane is added at 28° C. with stirring by means of a dissolver at 100-500 rpm with further cooling to 28° C. and the mixture is further stirred for 15 minutes under constant conditions.

The composition of the dispersions and their physicochemical properties are summarized in Table 3.

It shows that comparative example 4a without DMEA was firm.

When using DMEA up to 4% by weight, the inventive dispersions have a processable viscosity.

TABLE 3

Production of the aqueous SiO$_2$-containing dispersions with various DMEA concentrations

| Examples | Comp. ex 4a | Example 4b | Example 4c | Example 4d |
|---|---|---|---|---|
| Initial weights, g | | | | |
| Water | 58.30 | 56.95 | 55.63 | 54.30 |
| Tripropylene glycol (TPG) | 2.00 | 2.00 | 2.00 | 2.00 |

TABLE 3-continued

Production of the aqueous SiO$_2$-containing dispersions with various DMEA concentrations

| Examples | Comp. ex 4a | Example 4b | Example 4c | Example 4d |
|---|---|---|---|---|
| Dimethylaminoethanol (DMEA) | 0 | 1.35 | 2.67 | 4.00 |
| TEGO DISPERS ® 760W[a] | 17.00 | 17.00 | 17.00 | 17.00 |
| SiO$_2$ source[b] | 20.00 | 20.00 | 20.00 | 20.00 |
| Dimethyldiethoxysilane | 2.70 | 2.70 | 2.70 | 2.70 |
| All initial weights, sum total | 100.00 | 100.00 | 100.00 | 100.00 |
| Powder incorporation time, min | 60 | 45 | 20 | 15 |
| Dispersal time UT, min | 30 | 30 | 30 | 30 |
| pH | 7.0[c] | 10.4 | 10.7 | 10.9 |
| Viscosity at 0.5 sec$^{-1}$ mPa s[d] | firm | 9560 | 2250 | 501 |
| SiO$_2$ methanol wettability in % by volume | | 0 | 0 | 0 |

[a]TEGO DISPERS ® 760 W = dispersant, manufacturer Evonik Resource Efficiency GmbH,
[b]Aerosil ® 300, a hydrophilic silisca with BET = 300 m$^2$/g, manufacturer Evonik Resource Efficiency GmbH,
[c]after diluting with water to 5%
[d]measured with: Rheometer Physica MCR 300, manufacturer: Anton Paar GmbH, sample tubes composed of aluminium or stainless steel, rotary body CC27

4. Production of the Aqueous SiO$_2$-Containing Dispersions with Variation of the Silanization Temperature and Testing in a Lacquer System Comparative Example 4c***, Inventive Examples 4c, 4c*, 4c**

The influence of silanization temperature was investigated based on the formulation of example 4c (see Table 3).
The reaction was carried out at a silanization temperature of 23° C., 28° C., 37° C. and 60° C.
The physicochemical properties of the dispersions and the lacquers are evident from Table 4.

The silanization temperature of 60° C. results in firm dispersions (comp. ex. 4c***).
All inventive examples 4c, 4c* and 4c** are pumpable and are therefore by and large easy to handle and exhibit the desired increase of thixotropy in the Ecrothan lacquer. (see Table 4)
It was also demonstrated that at silanization temperatures >40° C., D$_4$ is formed as by-product which is classified as toxic. D$_4$ is determined by $^1$H-NMR spectroscopy by integration of the signals at 0.4 ppm, in which DMEA functions as internal standard ($^1$H-NMR, Bruker. 600 MHz, solvent DMSO).

TABLE 4

Production of the aqueous SiO$_2$-containing dispersions with variation of the silanization temperature and testing in a lacquer system

| Examples | Example 4c* | Example 4c | Example 4c** | Comp. ex 4c*** |
|---|---|---|---|---|
| Silanization temperature ° C. | 23 | 28 | 37 | 60 |
| Cyclooctamethyltetrasiloxane (D$_4$) ppm | 0 | 0 | ca. 3 | 400 |
| Viscosity, Dispersion at 0.5 sec$^{-1}$ mPa s[f] | 1010 | 2250 | 9100 | firm |
| Lacquer | L-P4c* | L-P4c | L-P4c** | — |
| Initial weights, g | | | | |
| Ecrothan 2012[a] | 80 | 80 | 80 | |
| Dipropylene glycol methyl ether (DPM) | 3 | 3 | 3 | |
| PnB[b] | 4.2 | 4.2 | 4.2 | |
| DPnB[c] | 2.2 | 2.2 | 2.2 | |
| Triethylamine (TEA) | 0.2 | 0.2 | 0.2 | |
| Water | 3 | 3 | 3 | |
| Tego Foamex ® 805 N[d] | 0.2 | 0.2 | 0.2 | |
| BYK 346[e] | 0.2 | 0.2 | 0.2 | |
| Dispersion | 10 | 10 | 10 | |
| Sum of initial weights, g | 103 | 103 | 103 | |
| Ti (Thix index) clearcoat | 3.70 | 3.05 | 2.70 | |

[a]Ecrothan 2012 = aqueous polyurethane-acrylate hybrid dispersion, manufacturer Michelman INC,
[b]PnB = Solvenon ® PnB, propylene glycol monobutyl ether 1-butoxy-2-propanol, manufacturer BASF SE.
[c]DPnB =Solvenon ® DPnB, dipropylene glycol monobutyl ether butoxydipropanol isomeric mixture, manufacturer BASF SE.
[d]Tego Foamex ® 805 N = defoamer, manufacturer Evonik Resource Efficiency GmbH
[e]BYK 346 = silicone surfactant, manufacturer BYK Additives & Instruments
[f]measured with: Rheometer Physica MCR 300, manufacturer: Anton Paar GmbH, sample tubes composed of aluminium or stainless steel, rotary body CC27

The invention claimed is:
1. An aqueous dispersion, comprising:
a. 50-80% by weight water,
b. 10-30% by weight hydrophilic silicon dioxide having a methanol wettability of 0% by volume methanol in a methanol-water mixture,
c. 2-25% by weight of at least one alcohol alkoxylate of the general formula $R^1O((CH_2)_mO)_nH$, wherein
   $R^1$ is a branched or unbranched alkyl or alkenyl radical having 10-25 carbon atoms, m=2 or 3 and n=10-50,
d. 0.1-20% by weight of a silanol obtained by hydrolysis of at least one dialkoxysilane of the general formula $R^2R^3Si(OR^4)_2$, wherein $R^2$, $R^3$ and $R^4$ are in each case a branched or unbranched alkyl or alkenyl radical having 1-25 carbon atoms,
e. 0.5-4% by weight of at least one amine and/or an amino alcohol having a molecular weight of less than 500 g/mol and
f. 0.1-20% by weight of at least one copolymer of the general formula (I)

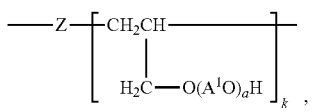
(I)

wherein Z=

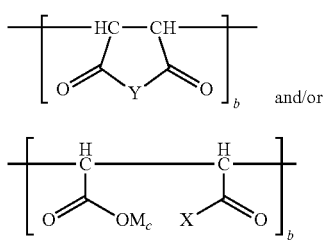

wherein
M=hydrogen, monovalent or divalent metal cation, ammonium ion, r organic amine radical,
c=1, or where M is a divalent metal cation, c=0.5
X=—$OM_c$, —O—$(C_pH_{2p}O)_q$—$R^5$, —$NHR^6$, —$NR^6_2$, or —CO—$NH_2$ wherein
$R^5$ and $R^6$ each=H, aliphatic hydrocarbon radical having 1 to 20 carbon atoms, cycloaliphatic hydrocarbon radical having 5 to 8 carbon atoms, or optionally substituted alkyl radical having 6 to 14 carbon atoms,
p=2-4, q=0-100,
Y=O, $NR^6$
$A^1$=ethylene radical, propylene radical, isopropylene radical, or butylene radical,
b=10-30, a=0-50, k=10-30, wherein a sum b+k is in the range of 20-60,
g. 0.1-6.0% by weight of at least one polyethylene glycol and/or polypropylene glycol,
wherein all figures refer to percentages by weight of an entirety of the dispersion composition.
2. The dispersion according to claim 1, wherein said dispersion has a pH of <11.
3. The dispersion according to claim 1, wherein the hydrophilic silicon dioxide has a carbon content of <0.1%, measured with a carbon analyser: LECO CS 244 (LECO Corporation, St. Joseph, Mich., 49085-2396, USA).
4. The dispersion according to claim 1, wherein the hydrophilic silicon dioxide has a silanol group density of 1.5-2.7 silanol groups/$nm^2$, measured by the lithium alanate method.
5. The dispersion according to claim 1, wherein the silanol is a dialkyldisilanol of the general formula

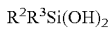

and/or an α,ω-dihydroxydialkylsiloxane of the general formula

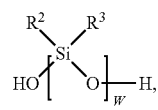

wherein $R^2$ and $R^3$ are in each case a branched or unbranched alkyl radical having 1-25 carbon atoms and w is an integer greater than 1.
6. The dispersion according to claim 1, wherein the hydrophilic silicon dioxide has a mean particle size $d_{50}$ of at most 300 nm.
7. The dispersion according to claim 1, wherein the hydrophilic silicon dioxide is a fumed silica having a BET surface area of 30 to 410 $m^2/g$.
8. The dispersion according to claim 1, wherein a molar ratio of silanol to silicon dioxide is from 0.02 to 0.2.
9. A lacquer preparation, comprising the dispersion according to claim 1.
10. A hydrofiller in the automotive industry, an additive in a water-based UV-curable formulation, an aqueous clearcoat, or a pigmented coating system, comprising the dispersion according to claim 1.
11. A process for producing the aqueous dispersion according to claim 1, the process comprising:
adding at least one dialkoxysilane of the general formula $R^2R^3Si(OR^4)_2$, wherein $R^2$, $R^3$ and $R^4$ are in each case a branched or unbranched alkyl or alkenyl radical having 1-25 carbon atoms, to a mixture comprising 50-80% by weight water and 10-30% by weight hydrophilic silicon dioxide at a pH of the dispersion of <11, wherein a temperature of the resulting dispersion during and after the addition of the dialkoxysilane does not exceed 40° C.
12. The process according to claim 11, wherein the hydrophilic silicon dioxide used is a fumed silica having a BET surface area of 30 to 410 $m^2/g$.
13. The process according to claim 11, wherein a molar ratio of dialkoxysilane used to silicon dioxide used is from 0.02 to 0.2.
14. The process according to claim 11, wherein the mixture comprising water and silicon dioxide used is produced by adding the hydrophilic silicon dioxide to an aqueous mixture at a rotational speed of at least 2000 rpm.
15. The process according to claim 11, wherein the aqueous dispersion is stirred at 100-500 rpm (disc diameter 40 mm) during the adding of dialkoxysilane and for a further 15 minutes after the adding.
16. The process according to claim 11, wherein the aqueous dispersion after the adding of dialkoxysilane is matured at a temperature of 0 to 40° C. for at least 24 hours.

* * * * *